United States Patent [19]

Baudoin et al.

[11] 4,165,116

[45] Aug. 21, 1979

[54] GRIPPING APPARATUS FOR THE TONGS OF A REMOTE MANIPULATOR

[75] Inventors: Jean-Claude Baudoin, Paris; Robert Oger, Antony, both of France

[73] Assignee: Commissariat a l'Energie Atomique, Paris, France

[21] Appl. No.: 852,467

[22] Filed: Nov. 17, 1977

[30] Foreign Application Priority Data

Dec. 3, 1976 [FR] France .................................. 76 36486

[51] Int. Cl.² .......................................... B66C 1/66
[52] U.S. Cl. ....................................... 294/86 R; 414/1
[58] Field of Search ................ 294/1 R, 22, 27 R, 68, 294/67 B, 67 BA, 67 D, 67 DA, 67 DB, 69 R, 73, 86 R, 86 A, 88, 106; 3/12.8; 16/110 R, 114 R, 124; 214/1 CM, 650 R, 653; 220/1.5, 71, 94

[56] References Cited

U.S. PATENT DOCUMENTS

| | | |
|---|---|---|
| 1,766,507 | 6/1930 | Coe .......................................... 294/68 |
| 3,484,014 | 12/1969 | Munch ..................................... 220/1.5 |
| 3,491,938 | 1/1970 | Goodsite et al. ..................... 294/22 X |
| 3,815,175 | 6/1974 | Szabados ................................. 16/114 |
| 3,823,459 | 7/1974 | Molochnikov et al. ........... 294/86 R |
| 3,888,362 | 6/1975 | Fletcher et al. ............. 214/1 CM X |

Primary Examiner—Johnny D. Cherry

[57] ABSTRACT

Gripping apparatus for the tongs of a remote manipulator having two generally triangular symmetrical elongated projections, each articulated to a tong body and having a rear end piece opposite to the end of the projection, wherein a detachable member which is fixed to each object to be manipulated and having a central portion which can be seized between the projections of the tongs, a supporting edge for the end piece of the projections projecting on either side of the central portion and two parallel flanges extending perpendicularly to the plane of the central portion on either side of the latter in order to cover the tong projections fastened to the central portion. A particular application of the apparatus is to handle radioactive materials in an active cell.

8 Claims, 9 Drawing Figures

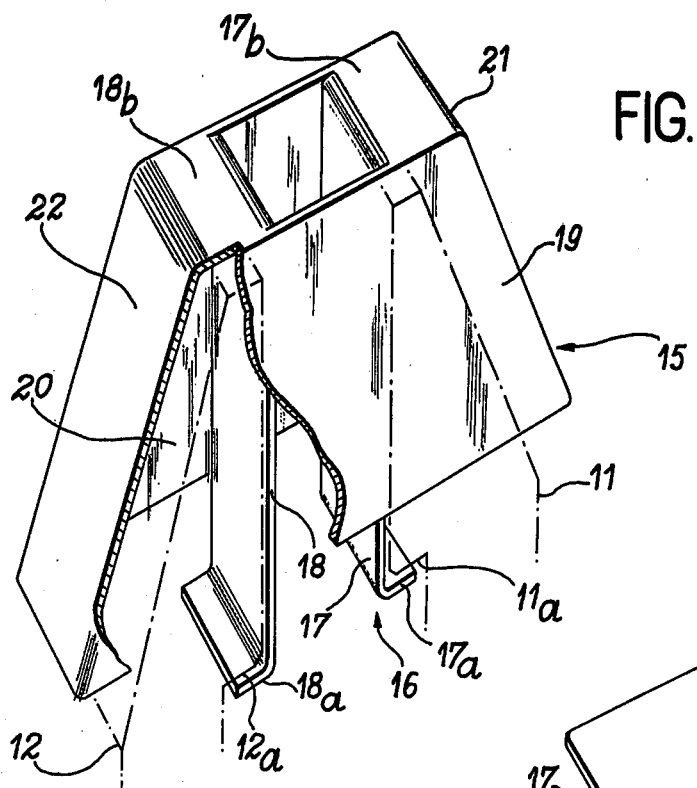
FIG. 2
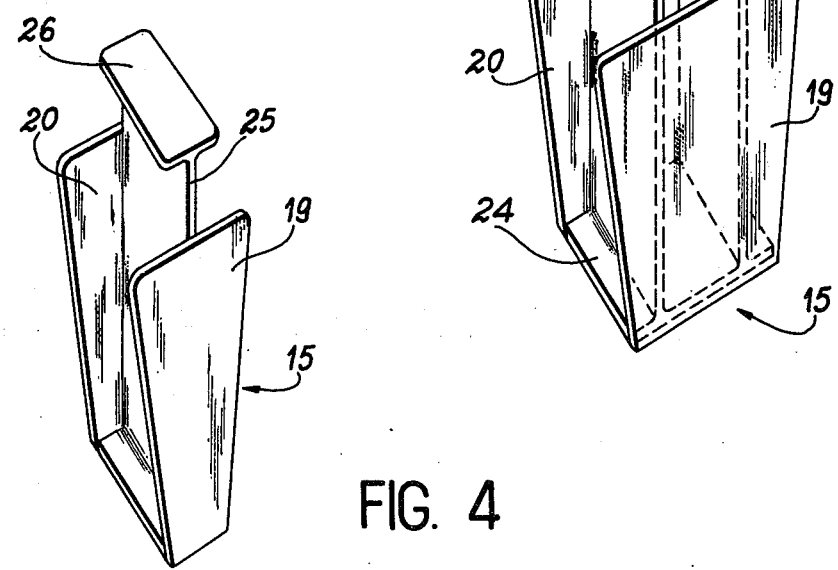
FIG. 3
FIG. 4

GRIPPING APPARATUS FOR THE TONGS OF A REMOTE MANIPULATOR

BACKGROUND OF THE INVENTION

The present invention relates to a gripping apparatus which is in particular to cooperate with the tongs of a remote manipulator in order to permit a reliable and easy remote handling of various objects or loads within an active cell, ensuring the protection of the external environment against radioactive contamination and ionising radiation. As a result of the invention, only minimum tightening of the tongs are necessary which decreases wear to the manipulator during its use.

It has been found that the handling of radioactive materials of various shapes, weights and types in a shielded cell by means of a remote manipulator causes a number of problems. A particularly significant problem is the ensuring of an effective gripping of said materials at an appropriate point, the latter being a function not only of the position of the centre of gravity and the load to be handled, but also of special functional requirements particularly in the case of containers or the like containing liquids, making it necessary to maintain said containers in a vertical or substantially vertical position. Moreover, in the case of glass objects or materials or generally fragile materials, the manipulator tongs must grip at precisely the correct point to avoid the risk of fracturing or breaking said containers. Finally, in certain cases the manipulator tongs encounter difficulties in conveniently seizing an object if the latter is located in a recess of the cell or in an area of the latter encumbered with other materials or objects.

BRIEF SUMMARY OF THE INVENTION

The invention therefore relates to a gripping apparatus of very simple design which obviates these disadvantages whilst permitting the manipulator tongs to grip the random object to be manipulated in the cell in a reliable manner and at the most suitable point. This apparatus has a low cost price and can easily be modified in various ways. Therefore, one object of the invention is to obviate the prior making of a groove in the body of the objects to be handled involving costly prior machining and which is also difficult to carry out, for example in the case of a glass object. Another object is to obviate the need during the design of the apparatus of specifying the definitive gripping position.

To this end, the invention relates to a gripping apparatus for the tongs of a remote manipulator having two generally triangular symmetrical elongated projections, each articulated to a tong body and having a rear end piece opposite to the end of the projection, wherein it comprises a detachable member which is fixed to each object to be manipulated by a fixing means and having a central portion which can be seized between the projections of the tongs, a supporting edge for the end piece of the projections projecting on either side of said central portion and two parallel flanges extending perpendicularly to the plane of said central portion on either side of the latter in order to cover the tong projections fastened to the central portion.

The central portion comprises two flat parallel bands bent at at least one of their ends in order to form the supporting edge of the end pieces of the projections. As a variant, the central portion has a single band welded at the end to a projecting transverse small plate.

According to a special embodiment of the invention, the means for fixing the detachable member to the object to be manipulated comprise at least one clip which surrounds the object and is fixed to the central portion. As a variant, said means comprise a nut fixed to the central portion and cooperating with a screw carried by the object to be manipulated or vice versa. According to another variant, the fixing means comprise welded points or a screw connection, said screw cooperating with tapped holes in the object.

BRIEF DESCRIPTION OF THE DRAWINGS

Other characteristics of a gripping apparatus according to the invention can be gathered from the following description of several embodiments given in an illustrative and non-limitative manner with reference to the attached drawings, wherein:

FIGS. 2 to 4 are perspective views of different embodiments of the present gripping apparatus;

DETAILED DESCRIPTION OF THE PREFERRED EMBODIMENTS

Figure 1:
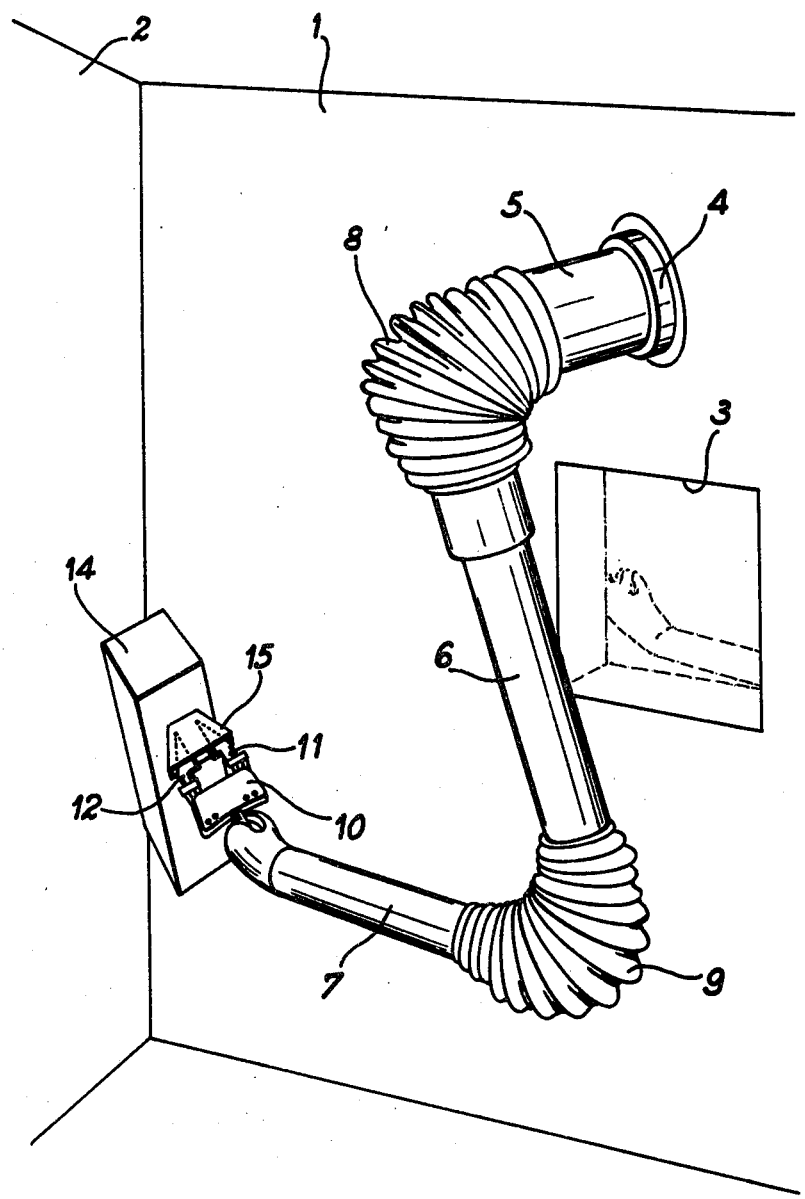
FIG. 1 diagrammatically illustrates a remote manipulator whose controlled portion located inside a shielded cell is equipped with tongs cooperating with a gripping apparatus according to the invention fixed to an object to be handled within said cell.

FIG. 1 diagrammatically shows a shielded cell, particularly for handling radioactive objects, whose design is known per se. The drawing only shows two walls 1 and 2 of said cell, wall 1 having a porthole 3 which permits an operator positioned outside the cell to clearly see the inside thereof and particularly objects contained therein.

In order to carry out the manipulation of these objects, wall 1 of the cell has a sealed passage 4 for a support shaft 5 of arm 6 of a remote manipulator itself extended by a forearm 7. The arm and forearm are respectively articulated to shaft 5 and to arm 6 about not shown shoulder and elbow axes protected by tight bellows 8 and 9. At its end opposite to the elbow articulation, forearm 7 carries a body 10 on which are articulated two tong projections 11,12 which are able to manipulate random objects, loads or materials of the type represented schematically by reference numeral 14 in the drawing within the active cell.

According to the invention, the gripping of object 14 by projections 11 and 12 of the tongs is effected via a gripping apparatus 15, several embodiments of which are illustrated on a larger scale in FIGS. 2 to 4.

In a first embodiment shown in FIG. 2, the present gripping apparatus mainly comprises a central portion 16 formed from two elongated parallel metal bands 17,18 having at one of their ends curved portions 17a and 18a forming supporting edges for the end pieces 11a and 12a of the tong projections 11,12. The apparatus also has two planar flanges 19,20 joined to the two bands 17,18 of central portion 16 and extending perpendicularly to the plane of the latter. By appropriate engagement of tong projections 11 and 12, the latter abut by their ends opposite to end pieces 11a and 12a against an end constituted by extensions 17b,18b of bands 17,18.

In the present embodiment extensions 17b,18b are laterally extended by two flanks 21,22 connected directly to edges of plates 19,20. Thus, on either side of bands 17,18 cavities are formed which permit both an axial locking of the tong projections due to their end pieces bearing against extensions 17a,18a and a transverse immobilisation due to plates 19,20 of the tong projections, thus bringing about a close connection between the apparatus and the projections.

In the embodiment of FIG. 3, bands 17,18 of the central portion are fixed, particularly by welding, to two parallel end plates 23,24, whereby plate 23 projects laterally of bands 17,18 in order to form the supporting edges of the end pieces of the tong projections (not shown here). In this variant it is possible to see plates 19,20, the recesses in which engage the tong projections defined between bands 17,18 and plates 19,20 in this case being open towards the outside.

In the embodiment of FIG. 4 the two plates of the central portion are replaced by a single axial plate 25 having a terminal edge 26 for supporting the end pieces of the projections, said plate 25 also being welded to lateral plates 19,20. As hereinbefore, the recesses in which the tong projections engage are open towards the outside.

FIGS. 5 to 8 illustrate several variants of the fixing means permitting the fixing of the gripping apparatus illustrated, for example, in FIG. 3 to a random object to be manipulated in the shielded cell.

Figure 5:
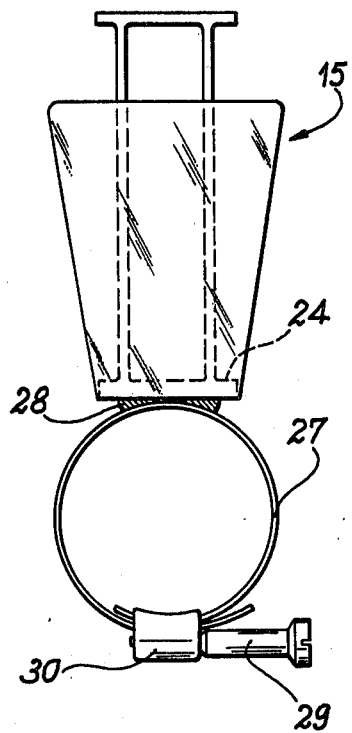
FIGS. 5 to 8 are part sectional views showing in diagrammatic manner several embodiments of the means associated with the gripping apparatus in order to ensure its fixing to the object to be handled.

In the embodiment shown in FIG. 5 the apparatus 15 is rendered integral via plate 24 with a clip 27 by means of welding points 28. Clip 25, which is of the rack tightening type, has a screw 29 mounted in a box 30, whereby the rotation of said screw permits in a continuous manner the tightening of clip 27 in order to maintain within the latter the object to be manipulated which is not shown in the drawing.

Figure 6:
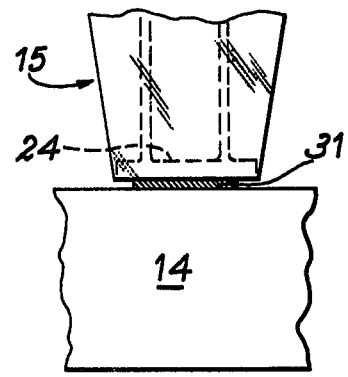
Figure 8:
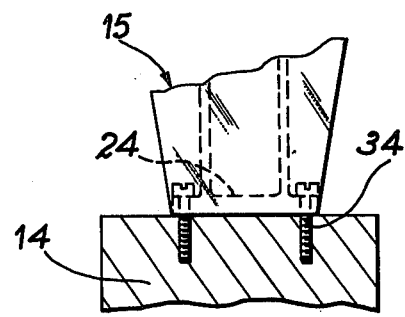
Figure 7:
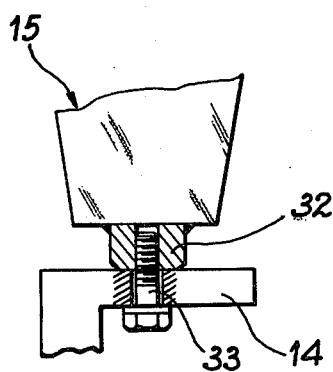
Figure 9:
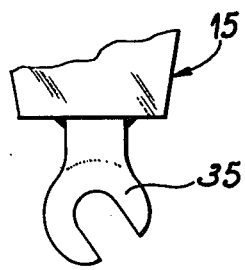
FIG. 9 is a detail illustrating another variant of the apparatus in question.

In the variant according to FIG. 6, object 14 is fixed to end plate 24 of apparatus 15 by a welding spot 31. In the embodiment of FIG. 7 apparatus 15 has at the end a contact stud 32 provided axially with a tapped hole permitting a threaded screw 33 which projects from object 14 to fix the latter to the gripping apparatus. Finally, in the embodiment of FIG. 8, end plate 24 is immobilised relative to object 14 by means of head screw 34 which passes through said plate and cooperates with tapped holes provided in the actual object.

With reference to a different and special application object 15 can have at its end a working tool which is to be used within the active cell, such as for example a spanner 35, a screw-driver or any similar means, whereby once the gripping apparatus has been fixed to the manipulator tongs it is much easier to operate said tool than if the latter were merely seized directly by the tong projections.

Thus, a gripping apparatus is obtained which is particularly simple and can be adapted to the handling of all types of objects within an active cell, whereby said apparatus provides a direct cooperation between the manipulator tong projections and each object to be handled without interfering with the shape or construction of the object. It should also be noted that the construction of the actual apparatus can easily be adapted to the various objects to be handled, particularly with respect to the weight thereof. As an example the embodiment of FIG. 2 is particularly intended for heavy weights, whilst that illustrated in FIG. 4 is intended for lighter weights. In all cases the material grasped in the tongs via the apparatus will be reliably but not tightly grasped whilst there is no risk of the object being released in an unintentional manner. Moreover, the shape of the apparatus makes it easy to disengage the projections from the tongs at the end of tightening, thus permitting greater ease of movement even in difficultly accessible recesses within the cell.

The invention is not limited to the embodiments described and represented hereinbefore and various modifications can be made thereto without passing beyond the scope of the invention.

What is claimed is:

1. A gripping apparatus for the tongs of a remote manipulator having two generally triangular symmetrical elongated projections, each articulated to a tong body and having a rear end piece opposite to the end of the projection, wherein said apparatus comprises a detachable member which is fixed to each object to be manipulated by a fixing means and having a central portion which can be seized between the projections of the tongs, a supporting edge for the end piece of the projections projecting on either side of said central portion and two parallel flanges extending perpendicularly to the plane of said central portion on either side of the latter in order to cover the tong projections fastened to the central portion.

2. An apparatus according to claim 1, wherein the central portion is constituted by two parallel flat bands bent at at least one of their ends to form the supporting edge of the end pieces of the projections.

3. A remote manipulator having tongs and provided with a gripping apparatus according to claim 2.

4. An apparatus according to claim 1, wherein the central portion has a single band terminally welded to a projecting transverse small plate.

5. An apparatus according to claim 1, wherein the means for fixing the detachable member to the object to be manipulated comprise at least one clip which surrounds the object and is fixed to the central portion.

6. An apparatus according to claim 1, wherein the fixing means comprise a nut fixed to the central portion and cooperating with a screw carried by the object to be manipulated.

7. An apparatus according to claim 1, wherein the fixing means comprise welding points.

8. An apparatus according to claim 1, wherein the fixing means comprise a screw fixed to the central portion and cooperating with a tapped hole in the object to be manipulated.

* * * * *